(12) United States Patent
Gaspar et al.

(10) Patent No.: US 9,850,977 B2
(45) Date of Patent: *Dec. 26, 2017

(54) BOLT THROUGH HYDRAULIC MOUNT WITH AND WITHOUT A DECOUPLER

(71) Applicant: The Pullman Company, Milan, OH (US)

(72) Inventors: Zoren E. Gaspar, Huron, OH (US); Jay W. Thornhill, Milan, OH (US)

(73) Assignee: The Pullman Company, Milan, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,415

(22) Filed: Aug. 17, 2016

(65) Prior Publication Data

US 2016/0356336 A1    Dec. 8, 2016

Related U.S. Application Data

(60) Continuation of application No. 14/754,740, filed on Jun. 30, 2015, now Pat. No. 9,441,704, which is a division of application No. 14/028,606, filed on Sep. 17, 2013, now Pat. No. 9,097,310.

(60) Provisional application No. 61/702,828, filed on Sep. 19, 2012.

(51) Int. Cl.
    *F16F 13/16*    (2006.01)
    *F16F 13/14*    (2006.01)
    *F16F 13/08*    (2006.01)
    *F16F 15/02*    (2006.01)

(52) U.S. Cl.
    CPC ............. *F16F 13/16* (2013.01); *F16F 13/08* (2013.01); *F16F 13/1463* (2013.01); *F16F 15/022* (2013.01)

(58) Field of Classification Search
    CPC .......... F16F 13/16; F16F 13/08; F16F 15/022; F16F 13/1463
    USPC ... 267/140.13, 140.11, 140.12, 141.1, 141.5, 267/219, 293
    See application file for complete search history.

(56) References Cited

U.S. PATENT DOCUMENTS

| 4,418,897 A | 12/1983 | Hartel et al. |
| 4,759,534 A | 7/1988 | Hartel |
| 4,936,556 A | 6/1990 | Makibayashi et al. |
| 5,005,810 A | 4/1991 | Sawada et al. |
| 5,498,060 A | 3/1996 | Satomi |

(Continued)

*Primary Examiner* — Thomas J Williams
*Assistant Examiner* — Mariano Sy
(74) *Attorney, Agent, or Firm* — Harness, Dickey & Pierce, P.L.C.

(57) ABSTRACT

The present disclosure relates to an hydraulic mount for coupling first second components in a vehicle. The mount has a first elastomeric member defining a first portion of a first chamber, and a second elastomeric member defining a second portion of the first chamber and a second chamber. The chambers are each able to retain fluid in a liquid seal manner. An inner tube assembly defines an opening for receiving a bolt. The elastomeric members may be fixedly secured to an outer surface of the inner tube assembly. An inner ring is fixedly coupled to the inner tube assembly at a position between the two chambers. The second elastomeric member is fixedly secured to an outer surface of the inner ring. A decoupler is fixedly disposed within the inner ring and adapted to move between rigid surfaces adjacent the first and second chambers.

15 Claims, 6 Drawing Sheets

(56) References Cited

U.S. PATENT DOCUMENTS

| | | |
|---|---|---|
| 5,690,320 A | 11/1997 | Kanda |
| 6,981,696 B2 | 1/2006 | Hatano et al. |
| 7,584,944 B2 | 9/2009 | Goudie |
| 8,091,871 B2 | 1/2012 | Bradshaw et al. |
| 8,177,201 B2 | 5/2012 | Goudie |
| 9,097,310 B2 * | 8/2015 | Gaspar ................ F16F 13/1463 |
| 9,163,695 B2 | 10/2015 | Saito et al. |
| 9,441,704 B2 * | 9/2016 | Gaspar ................ F16F 13/1463 |
| 2004/0135299 A1 | 7/2004 | Kuwayama |
| 2006/0261531 A1 | 11/2006 | Kim |
| 2008/0018031 A1 | 1/2008 | Goudie |
| 2011/0210489 A1 | 9/2011 | Bradshaw et al. |
| 2013/0015614 A1 * | 1/2013 | Bradshaw ................ F16F 13/16 |
| | | 267/140.13 |
| 2013/0038006 A1 | 2/2013 | Saito et al. |
| 2013/0069288 A1 | 3/2013 | Saito et al. |
| 2016/0003322 A1 | 1/2016 | Bradshaw et al. |

* cited by examiner

BOLT THROUGH HYDRAULIC MOUNT WITH AND WITHOUT A DECOUPLER

CROSS-REFERENCE TO RELATED APPLICATIONS

This application is a continuation application of U.S. application Ser. No. 14/754,740, filed Jun. 30, 2015 (now allowed); which is a divisional application of U.S. patent application Ser. No. 14/028,606 filed on Sep. 17, 2013 (now U.S. Pat. No. 9,097,310), which claims the benefit of U.S. Provisional Application No. 61/702,828, filed on Sep. 19, 2012. The entire disclosures of each of the above applications are incorporated herein by reference.

FIELD

The present disclosure relates to a bolt through hydraulic mount for coupling components of a vehicle.

BACKGROUND

This section provides background information related to the present disclosure which is not necessarily prior art.

Dampening mounts are commonly used to couple two components of a vehicle while damping vibrations between the components. Damping mounts may be utilized for automotive engine mounts, sub-frame mounts, and body mounts.

To limit the vibrational movement between two components, dampening mounts may include two separate mount assemblies. A dampening mount may, for example, include an elastomeric mount member and a hydraulic mount member. The elastomeric mount member may be disposed between two components of the vehicle. The hydraulic mount member may be coupled with the elastomeric mount member such that one of the components is disposed therebetween. The elastomeric mount member absorbs vibrations deflected between the first and the second component. Furthermore, the elastomeric mount member exerts a load onto the hydraulic mount member which pushes fluid between two chambers to dampen vibrations exerted by the components.

SUMMARY

This section provides a general summary of the disclosure, and is not a comprehensive disclosure of its full scope or all of its features.

In one aspect the present disclosure relates to an hydraulic mount for coupling a first component and a second component in a vehicle. The mount may comprise a first elastomeric member defining a first portion of a first chamber, and a second elastomeric member defining a second portion of the first chamber and a second chamber. The first chamber and the second chamber are each able to retain fluid in a liquid seal manner. An inner tube assembly may be included which defines an opening for receiving a bolt. The first elastomeric member and the second elastomeric member may be fixedly secured to an outer surface of the inner tube assembly. An inner ring may be included which is fixedly coupled to the inner tube assembly at a position between the first chamber and the second chamber. The second elastomeric member may be fixedly secured to an outer surface of the inner ring. A decoupler may be fixedly disposed within the inner ring, and is adapted to move between rigid surfaces adjacent the first and second chambers.

In another aspect the present disclosure relates to an hydraulic mount for coupling a first component and a second component in a vehicle. The mount may comprise a first elastomeric member defining a first portion of a first chamber, and a second elastomeric member defining a second portion of the first chamber and a second chamber. The first chamber and the second chamber each are able to retain fluid in a liquid seal manner. An inner tube assembly may be included which defines an opening for receiving a bolt. The first elastomeric member and the second elastomeric member may be fixedly secured to an outer surface of the inner tube assembly. An inner ring may be included which has an annular channel formed therein. The inner ring may be fixedly coupled to the inner tube assembly at a position between the first chamber and the second chamber, and the second elastomeric member may be fixedly secured to an outer surface of the inner ring. A fluid track component may also be included which has a serpentine passage formed on a wall surface thereof. The fluid track component may be disposed in the annular channel and may communicate with the first and second chambers to enable fluid flow therebetween to dampen vibrations.

In still another aspect the present disclosure relates to an hydraulic mount for coupling a first component and a second component in a vehicle. The mount may comprise a first elastomeric member defining a first portion of a first chamber, and a second elastomeric member defining a second portion of the first chamber and a second chamber. The first chamber and the second chamber are each able to retain fluid in a liquid seal manner. An inner tube assembly may be incorporated which defines an opening for receiving a bolt, wherein the first elastomeric member and the second elastomeric member are fixedly secured to an outer surface of the inner tube assembly. An inner ring may be included which is fixedly coupled to the inner tube assembly at a position between the first chamber and the second chamber. The inner ring may include an annular channel and arranged concentrically with the inner tube assembly. The second elastomeric member may be fixedly secured to an outer surface of the inner ring. A decoupler assembly may be fixedly disposed within the inner ring and may include a non-linear flow path formed on a surface thereof to channel flow along a non-linear path. The decoupler assembly may further include an element disposed for axial movement to further help control fluid flow between the first and second chambers, in response to vibrations.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
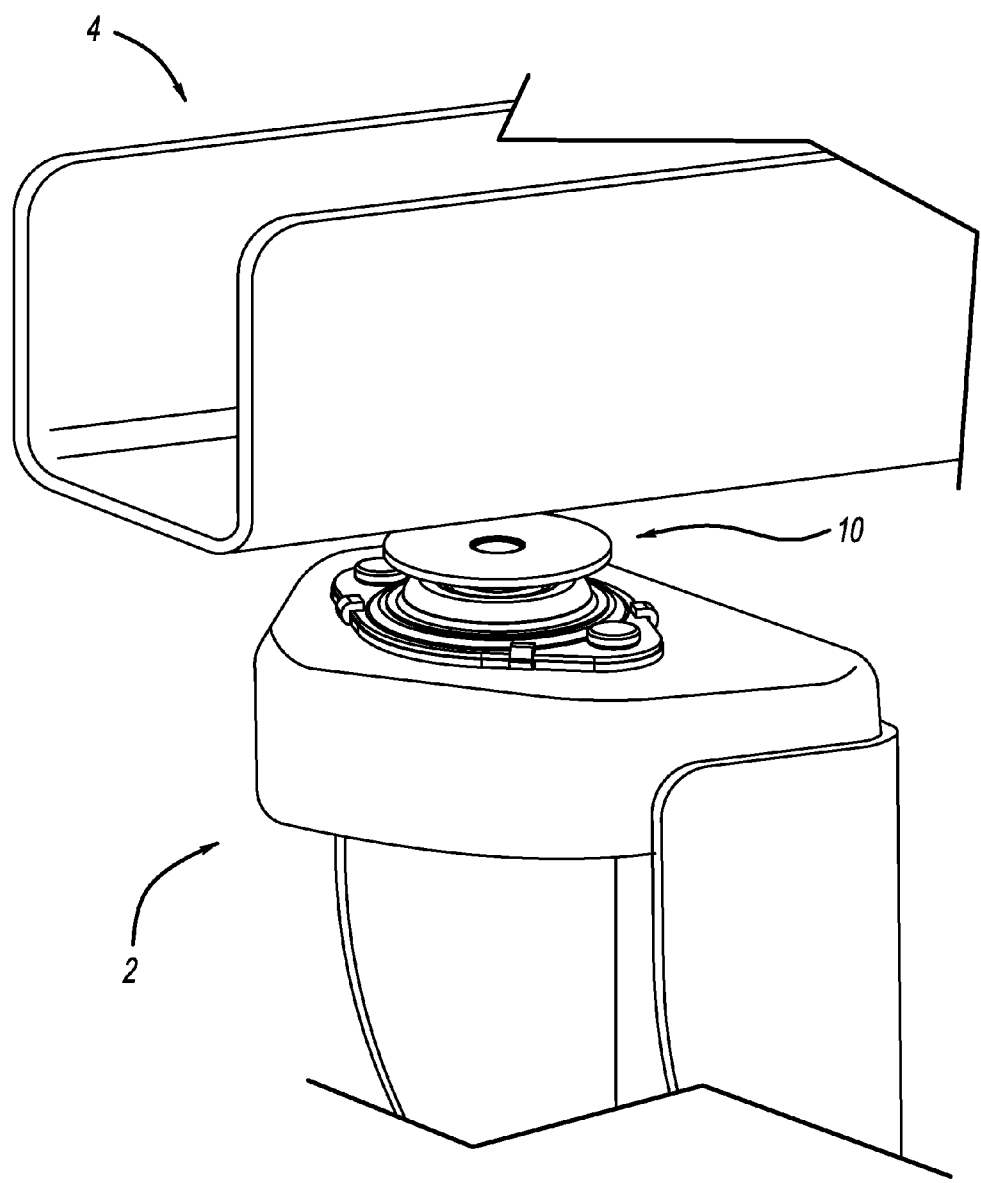
FIG. 1 is a perspective view of a hydraulic mount disposed between two vehicle components according to the present disclosure.
Figure 2:
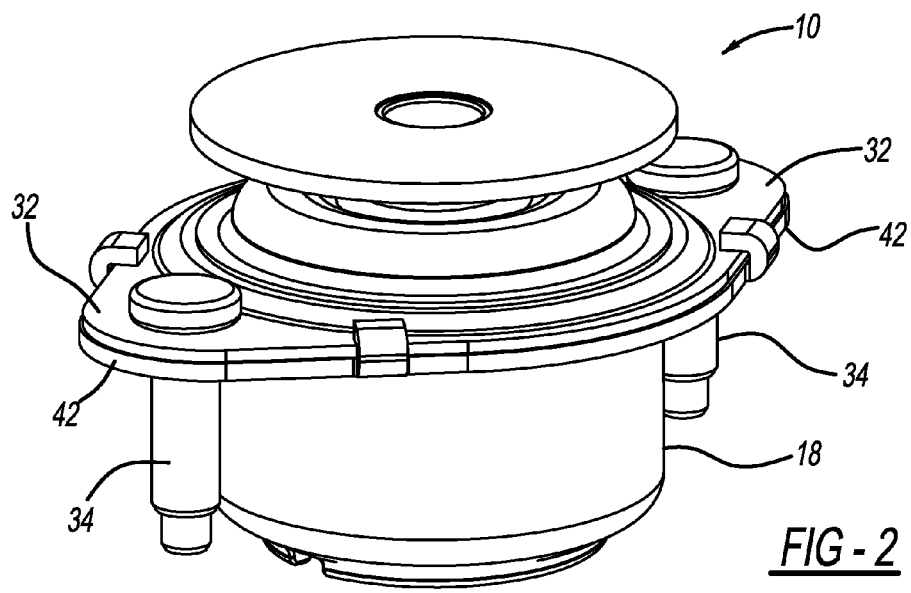
FIG. 2 is perspective view of the hydraulic mount in a first embodiment according to the present disclosure.
Figure 3:
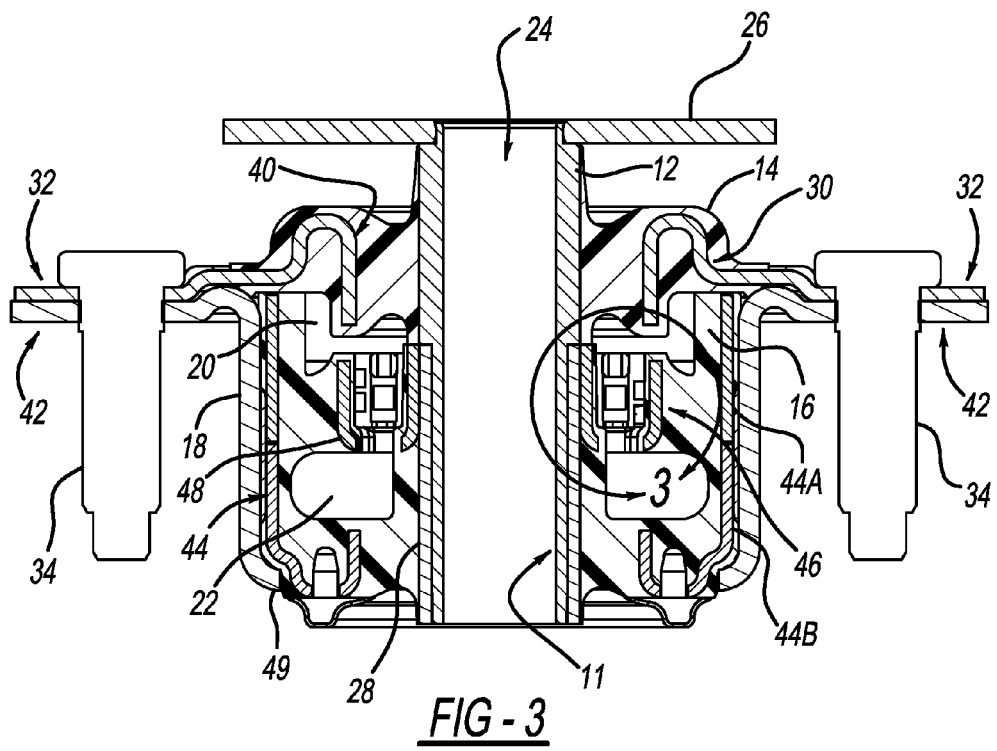
FIG. 3 is a cross-sectional view of the hydraulic mount of FIG. 2 according to the present disclosure.
Figure 4:
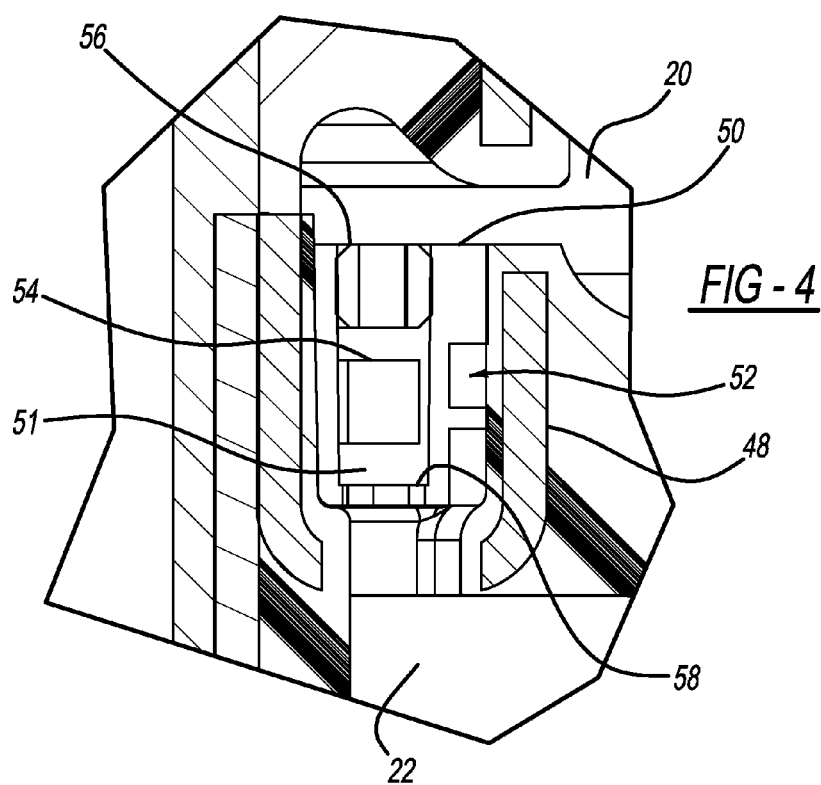
FIG. 4 is an expanded view of an inner ring and a track-decoupler assembly disposed within the hydraulic mount as provided in enlargement 3 of FIG. 3.
Figure 5:
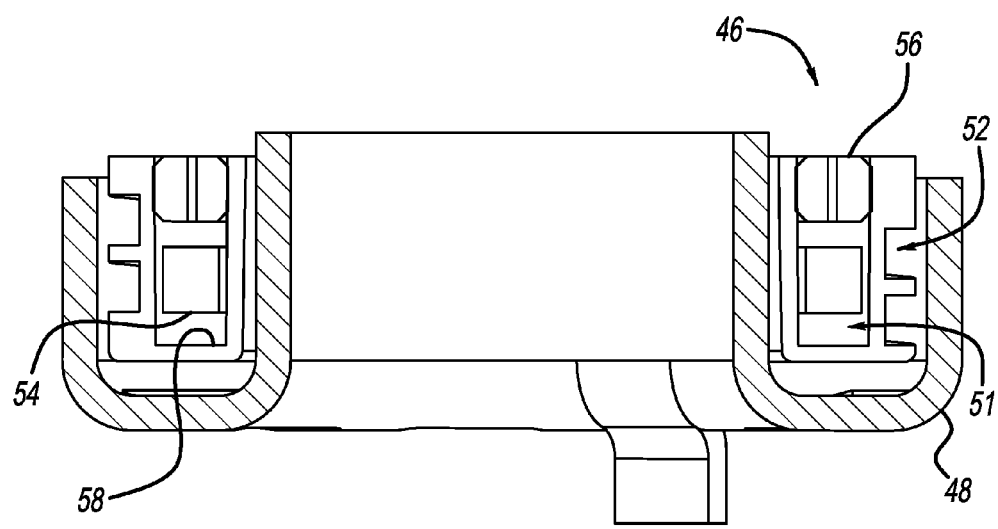
FIG. 5 is a cross-sectional view of the inner ring and the track-decoupler assembly of the first embodiment according to the present disclosure.

With reference to FIGS. 1-3, a hydraulic mount 10 having a bolt through construction in a first embodiment is presented. In operation, the mount 10 couples two vehicle components and dampens vibrations exerted by the vehicle components. For example, with reference to FIG. 1, an example of the mount 10 disposed between a first vehicle component 2 and a second vehicle component 4 is depicted.

The mount 10 includes an inner tube assembly 11, an upper elastomeric member 14, a lower elastomeric member 16, and a lower housing 18. When assembled, the upper elastomeric member 14 defines a first portion of an upper chamber 20 and the lower elastomeric member 16 defines a second portion of the upper chamber 20 and defines a lower chamber 22. Fluid sealed within the mount 10 flows between the upper chamber 20 and the lower chamber 22.

The inner tube assembly 11 is adapted to receive a bolt through an opening 24. The inner tube assembly 11 may include an inner tube 12 and a lower support 28. The inner tube 12 may have a cylindrical shape. An upper washer 26 is attached to one end of the inner tube 12. The upper washer 26 abuts with one of the vehicle components when the mount 10 is assembled between the two vehicle components.

The inner tube 12 is fixedly coupled to the lower support 28. The lower support 28 may be, for example, pressed-fit with the inner tube 12. When assembled, the lower support 28 and the inner tube 12 move as one piece. The inner tube 12, the upper washer 26, and the lower support 28 may be made of metal. It would be appreciated to one skilled in the art that the inner tube assembly 11 may have various suitable configurations and are not limited to the ones depicted in the drawings. For example, the lower support 28 of the inner tube assembly 11 may be fixedly coupled to an end portion of the inner tube 12.

The upper elastomeric member 14 may be molded around an upper ring 30. The upper ring 30 may be made of metal. The upper ring 30 may substantially have an annular configuration. The upper ring 30 may have at least two flange portions 32 that protrude laterally outward and are positioned at opposite sides of the upper ring 30. The flange portions 32 define an opening for receiving fasteners 34. The upper ring 30 may also include an angular portion 40. The angular portion 40 may have a hook shape cross-section. The angular portion 40 supports the upper elastomeric member 14 when shear and/or compressive forces are exerted by the vehicle components.

The upper elastomeric member 14 is bonded to the inner tube 12 and the upper ring 30. The upper elastomeric member 14 may be, for example, molded around the upper ring 30 and the inner tube 12. The upper elastomeric member 14 extends from the outer surface of the inner tube 12 to the upper ring 30 before the flange portion 32. In other words, the upper ring 30 is coupled to the inner tube 12 by way of the upper elastomeric member 14. The upper elastomeric member 14 is molded around the angular portion 40 of the upper ring 30.

The lower housing 18 supports the lower elastomeric member 16. The lower housing 18 may be fixedly coupled with the lower elastomeric member 16. For example, the lower elastomeric member 16 may be pressed-fit within the lower housing 18. The lower housing 18 may have a cylindrical shape, and may be made of metal. The lower housing 18 may include at least two flange portions 42 that protrude laterally outward and are formed on opposite sides of the lower housing 18. The flange portions 42 define a hole for receiving the fasteners 34.

The fasteners 34 may be used to attach the mount 10 to one of the vehicle components. Specifically, when assembled, the holes defined by the flange portions 32 of the upper ring 30 and the flange portions 42 of the lower housing 18 align with holes of the first vehicle component 2. The mount 10 may then be attached to the first vehicle component 2 by way of the fasteners 34 (FIG. 1).

An outer ring 44 is disposed within the lower housing 18. The outer ring 44 may provide structural support to the lower elastomeric member 16. The outer ring 44 may be made of metal. The outer ring 44 may be a two piece ring having a first ring 44A and a second ring 44B. The second ring 44B may have a hook shape cross-section. Although the outer ring 44 is depicted as a two piece ring, the outer ring 44 may also be made of one or more pieces.

The upper chamber 20 and the lower chamber 22 may communicate by way of a track-decoupler assembly 46. The track-decoupler assembly 46 is disposed within an inner ring 48. The inner ring 48 is fixedly coupled to the lower support 28. The inner ring 48 may be, for example, pressed-fit to the lower support 28. When assembled the inner ring 48, the lower support 28, and the inner tube 12 move as one. The inner ring 48 may be made of metal.

The lower elastomeric member 16 is bonded to the lower support 28, the inner ring 48, and the outer ring 44. The lower elastomeric member 16 is bonded to an outer surface of the inner ring 48. The lower elastomeric member 16 substantially extends from the outer surface of the lower support 28 to the outer ring 44. The lower elastomeric member 16 may be molded around the outer ring 44. When the lower elastomeric member 16 is pressed-fit to the lower housing 18, the outer ring 44 may structurally support the lower elastomeric member 16 and the lower elastomeric member 16 may form a buffer between the outer ring 44 and the lower housing 18. In addition, when assembled, the lower elastomeric member 16 may extend beyond an end portion 49 of the lower housing 18.

The lower elastomeric member 16 defines the lower chamber 22 below the inner ring 48 and defines the second portion of the upper chamber 20 above the inner ring 48. The upper chamber 20 and the lower chamber 22 extend circumferentially around the inner tube 12 and the lower support 28. The upper chamber 20 and the lower chamber 22 retain the fluid within the mount 10.

Various suitable methods for sealing the mount 10 can be employed. For example, o-rings may be disposed at interfaces within the mount 10, such as between an interface of the lower housing 18, the lower elastomeric member 16, and the upper elastomeric member 14. Clamps may also be used to couple the upper ring 30 and the lower housing 18.

With reference to FIGS. 4-7, the track-decoupler assembly 46 includes a decoupler housing 50, a fluid-track 52, a decoupler ring 54, and a decoupler cap 56. The track-decoupler assembly 46 is housed in the inner ring 48 between the upper chamber 20 and the lower chamber 22. The track-decoupler assembly 46 may be fixedly coupled to the inner ring 48. For example, the track-decoupler assembly 46 may be pressed-fit within the inner ring 48.

The decoupler housing 50 may be made of metal or plastic. The decoupler housing 50 defines an aperture 51. The aperture 51 retains the decoupler ring 54 and the decoupler cap 56.

Figure 6:
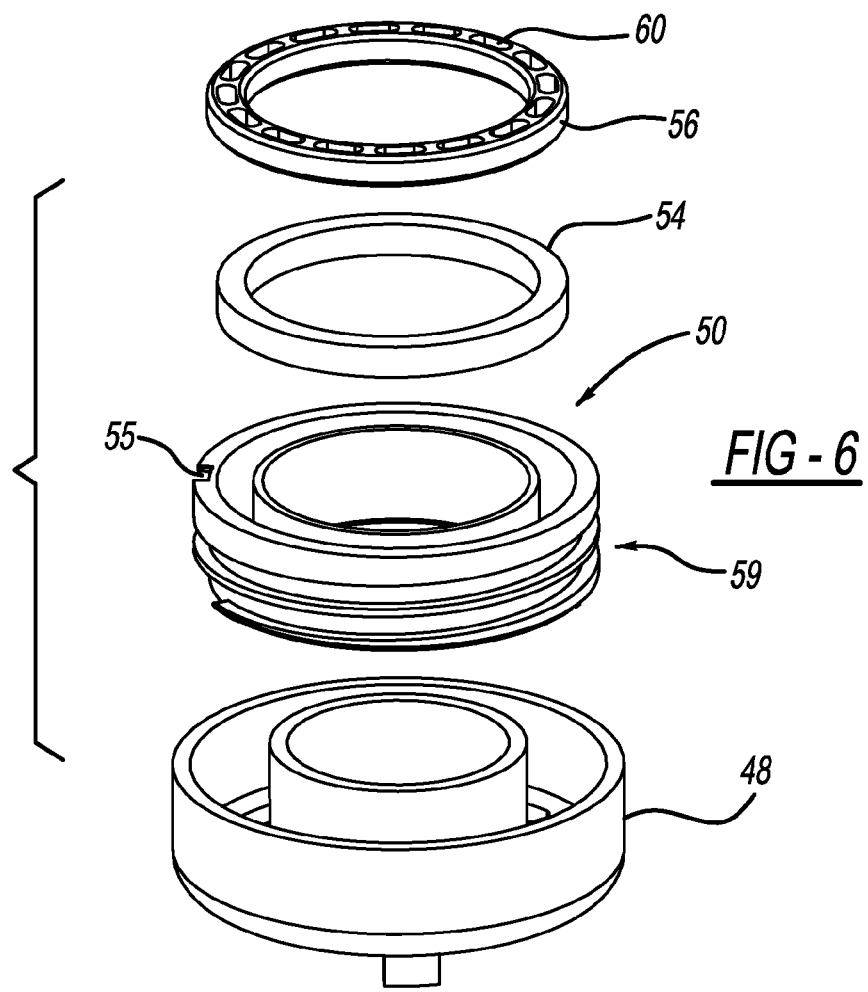
FIG. 6 is an exploded view of the inner ring and the track decoupler assembly of the first embodiment according to the present disclosure.
Figure 7:
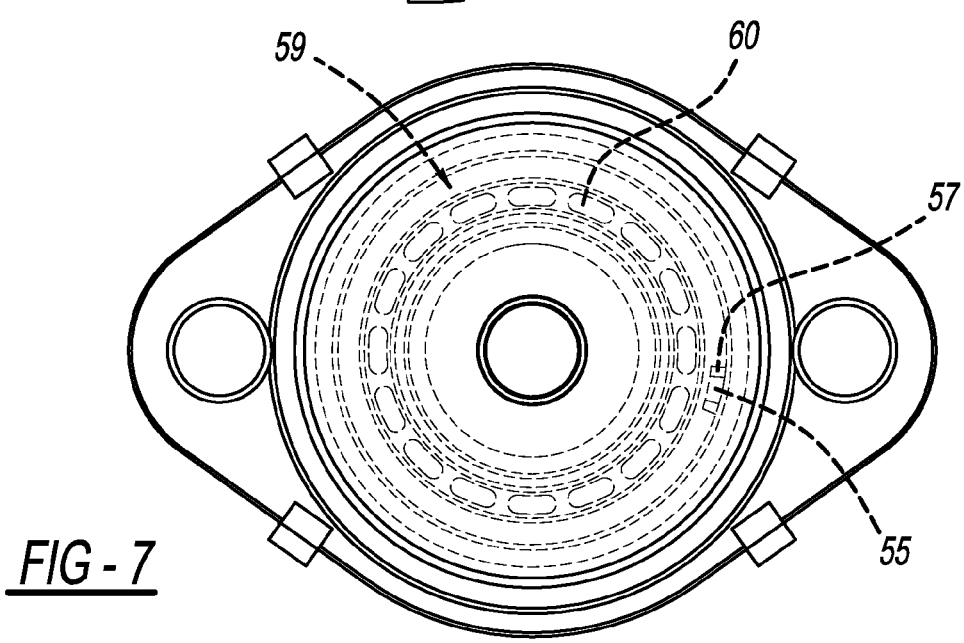
FIG. 7 is a top view of the hydraulic mount of FIG. 2 according to the present disclosure.
Figure 8:
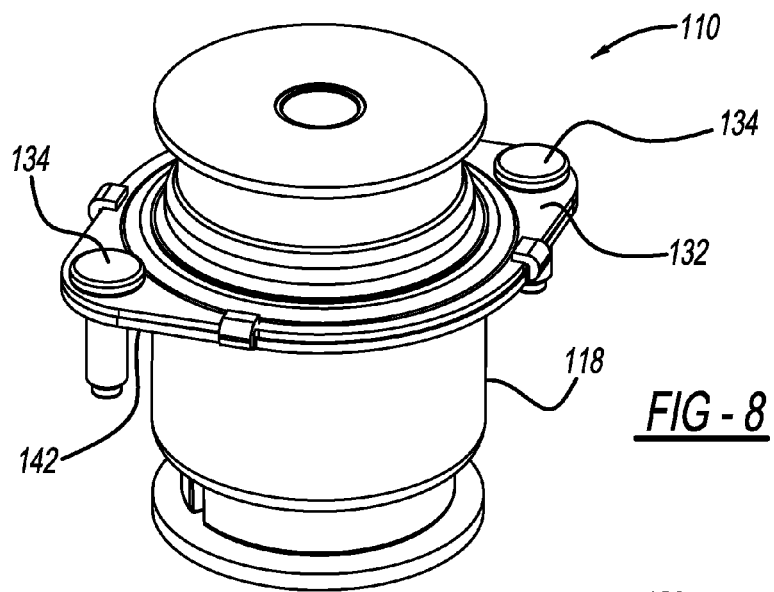
FIG. 8 is a perspective view of a hydraulic mount in a second embodiment according to the present disclosure.
Figure 9:
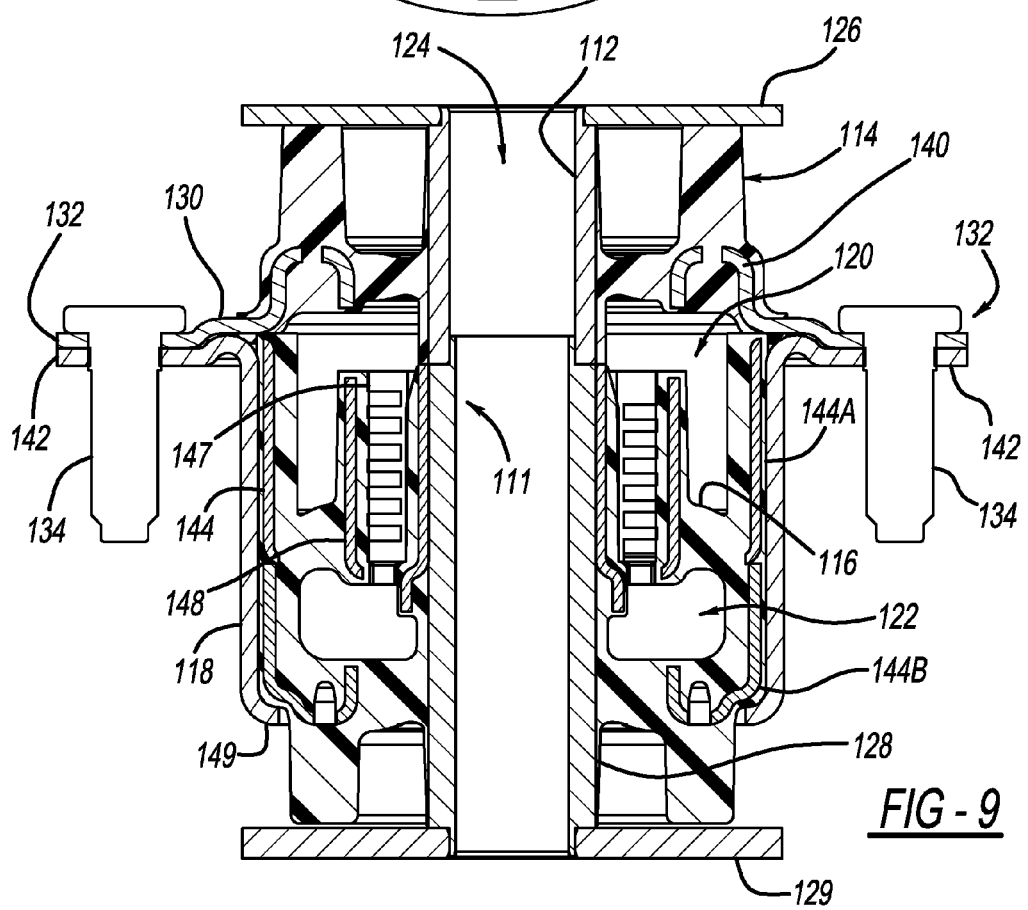
FIG. 9 is a cross-sectional view of the hydraulic mount of FIG. 8 according to the present disclosure.
Figure 10:
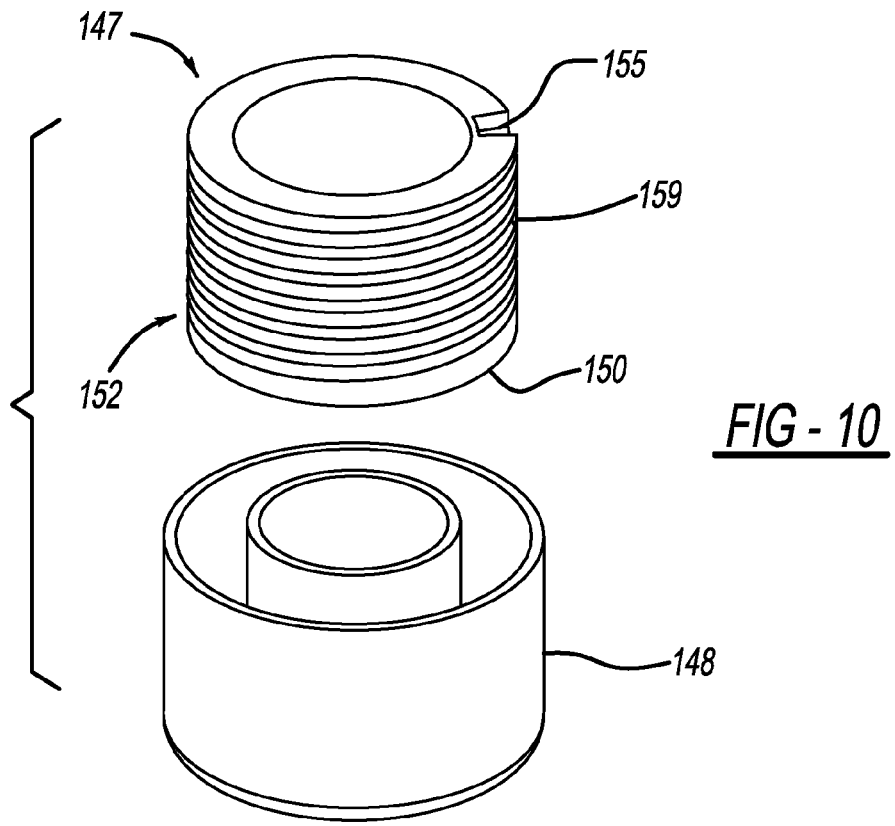
FIG. 10 is an exploded view of an annular ring and an inner ring of the hydraulic mount of the second embodiment according to the present disclosure.
Figure 11:
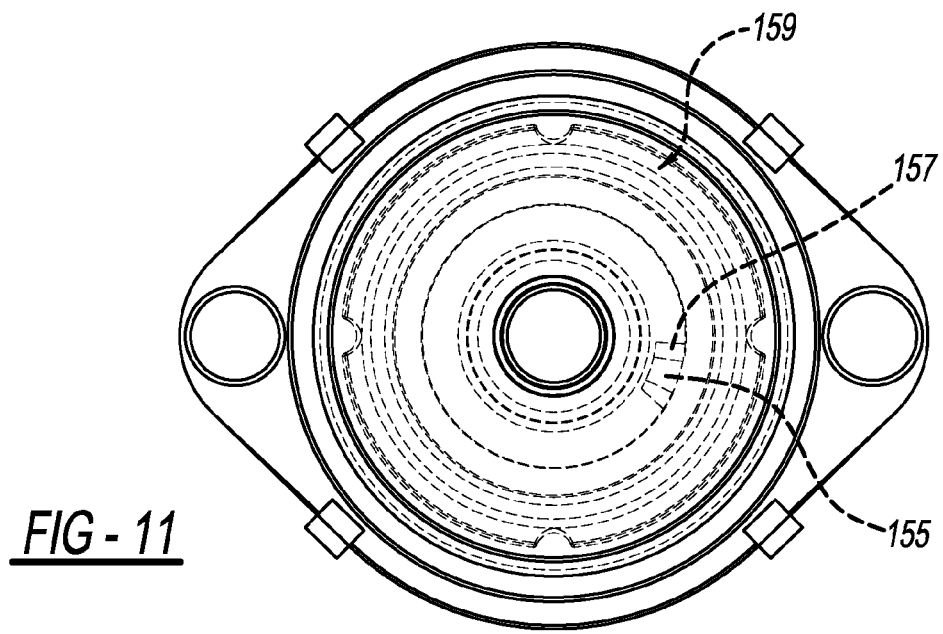
FIG. 11 is a top view of the hydraulic mount of FIG. 8 according to the present disclosure.

The fluid-track 52 is defined along an outer surface of the decoupler housing 50 (FIGS. 6 and 7). Fluid flows between the upper chamber 20 and the lower chamber 22 via the fluid-track 52. Specifically, the decoupler housing 50 defines an upper opening 55 and a lower opening 57. The upper chamber 20 may access the fluid-track 52 via the upper opening 55. The lower chamber 22 may access the fluid-track 52 via the lower opening 57. An opening defined by a bottom portion of the inner ring 48 (not shown) aligns with the lower opening 57 which provides access to the lower chamber 22. A passage 59 is defined in a serpentine manner along the outer surface of the housing 50 between the upper opening 55 and the lower opening 57. Accordingly, the fluid-track 52 fluidly couples the upper chamber 20 to the lower chamber 22.

The decoupler cap 56 may be made of metal or plastic. The decoupler cap 56 includes multiple openings 60 defined through the decoupler cap 56. The openings 60 allow fluid into the aperture 51. The decoupler cap 56 may be fixedly disposed within the decoupler housing 50. For example, the decoupler cap 56 may be bonded or pressed-fit within the decoupler housing 50. An upper surface of the decoupler cap 56 may be substantially flush with an upper surface of the decoupler housing 50.

The decoupler ring 54 may be made of plastic, rubber, or metal. The decoupler ring 54 is disposed within the aperture 51. Specifically, the decoupler ring 54 is arranged between a bottom surface 58 of the decoupler housing 50 and the decoupler cap 56. The decoupler ring 54 is adapted to float or move within the aperture 51. Specifically, the decoupler ring 54 freely moves between the bottom surface 58 and the decoupler cap 56.

The hydraulic mount 10 of the first embodiment couples the first vehicle component 2 and the second vehicle component 4. Specifically, the mount 10 may be fixedly coupled to the first vehicle component 2 by the flange portions 32 of the upper ring 30 and the flange portions 42 of the lower housing 18, as described above. Alternatively, the mount 10 may be coupled to the first vehicle component 2 by the lower housing 18. For example, the lower housing 18 may be pressed-fit to the first vehicle component 2, such as a bracket.

The second vehicle component 4 may be attached to the mount 10 by way of the bolt (not shown). Specifically, the bolt extends through the second vehicle component 4 and the upper washer 26 and the inner tube assembly 11 of the mount 10. The bolt may further be coupled to a nut to secure the bolt in place.

Accordingly, the mount 10 couples the first vehicle component 2 and the second vehicle component 4 by way of the upper washer 26, the inner tube assembly 11, and the lower housing 18. Furthermore, the upper elastomeric member 14 and the lower elastomeric member 16 springingly couple (elastomerically couple) the first vehicle component 2 and the second vehicle component 4 by way of the upper washer 26, the inner tube assembly 11, and the lower housing 18.

In operation, the hydraulic mount 10 isolates and dampens vibrations by way of the track-decoupler assembly 46. As the vehicle components move, the mount 10 deflects, thereby compressing and/or extending the upper elastomeric member 14. The upper elastomeric member 14 may absorb some of the load transmitted between the vehicle components.

The track-decoupler assembly 46 can be adapted to isolate and dampen vibrations at a predetermined amplitude. As the upper elastomeric member 14 compresses and/or extends at small amplitudes, the fluid within the mount 10 may be displaced. The movement of the decoupler ring 54 compensates and receives the fluid volume displaced by the mount 10 during small amplitude movement. Compensation provided by the decoupler ring 54 prevents fluid from pushing through the fluid track 52 (i.e., prevents dampening). Thus, at an amplitude less than the predetermined amplitude, the decoupler ring 54 isolates the mount 10 by compensating and receiving the fluid volume displaced.

At an amplitude larger than or equal to the predetermined amplitude, the decoupler ring 54 abuts against either the bottom surface 58 or the decoupler cap 56. The fluid may then push through the fluid-track 52 to dampen the vibration. As the mount 10 compresses and/or extends at the larger amplitude, one of the upper chamber 20 or lower chamber 22 is raised to a higher pressure than the other chamber 20 or 22. As a result, fluid is pushed from the higher pressure chamber to the lower pressure chamber via the fluid-track 52.

It would be appreciated to one skilled in the art that the upper elastomeric member 14 and the lower elastomeric member 16 may have various suitable configurations and are not limited to the ones depicted in the drawings. For example, the upper elastomeric member 14 may extend axially, such that it abuts with the upper washer 26 when the mount 10 is assembled.

Based on the foregoing, the hydraulic mount 10 of the first embodiment includes two elastomeric elements that form a hydraulic region. The hydraulic mount 10 has a one piece configuration for coupling two vehicle components. The hydraulic mount 10 can be adapted to isolate vibrations having an amplitude less than the predetermined amplitude and to dampen vibrations having an amplitude greater than the predetermined amplitude at a predetermined frequency. Specifically, the decoupler housing 50, the decoupler ring 54, and the decoupler cap 56 can be modified to isolate vibrations having an amplitude less than or equal to the predetermined amplitude for all frequencies. In conjunction with the decoupler housing 50, the decoupler ring 54, and the decoupler cap 56, the fluid-track 52 can be adapted to dampen vibrations having an amplitude greater than the predetermined amplitude at the predetermined frequency.

Some mounting applications may forego the use of the decoupler in order to, for example, reduce the cost of the mount, further minimize the complexity of the mount, achieve dampening at all amplitudes, etc. Accordingly, in a second embodiment of the present disclosure, a hydraulic mount 110 has a one piece mount configuration and dampens vibrations at all amplitudes of a predetermined frequency.

With reference now to FIGS. 8-11, the hydraulic mount 110 includes an inner tube assembly 111, an upper elastomeric member 114, a lower elastomeric member 116, and a lower housing 118. When assembled, the upper elastomeric member 114 defines a first portion of an upper chamber 120 and the lower elastomeric member 116 defines a second portion of upper chamber 120 and defines a lower chamber 122.

The inner tube assembly 111 includes an inner tube 112 and a lower support 128. The inner tube assembly 111 is adapted to receive a bolt through an opening 124. The inner tube 112 may have a cylindrical shape. An upper washer 126 is disposed at one end of the inner tube 112. The upper washer 126 may abut with one of the vehicle components when the mount 110 is disposed in the vehicle.

The inner tube 112 is fixedly coupled to the lower support 128. The lower support 128 may be pressed-fit with the inner tube 112. When assembled, the inner tube 112 and the lower support 128 move as one piece as the inner tube assembly 111 and define the opening 124.

The lower support 128 may have a lower washer 129 disposed at one end of the lower support 128. Accordingly, the mount 110 has the upper washer 126 at one end and has the lower washer 129 at the other end. The lower washer 129 is fixedly coupled to the lower support 128. The upper washer 126, the inner tube 112, the lower support 128, and the lower washer 129 may be made of metal.

The upper elastomeric member 114 may be molded around an upper ring 130. The upper ring 130 may have at least two flange portions 132 positioned at opposite sides of the upper ring 130. The flange portions 132 define an opening for receiving fasteners 134. The upper ring 130 may also include an angular portion 140. The angular portion 140 may have a hook shape cross section. The angular portion 140 supports the upper elastomeric member 114 when compressive and/or shear forces are exerted by the vehicle component.

The upper elastomeric member 114 is bonded to the inner tube 112 and the upper ring 130. The upper elastomeric member 114 may extend from the outer surface of the inner tube 112 to an area of the upper ring 130 before the flange portion 132. The upper elastomeric member 114 may extend axially from the upper chamber 120. Specifically, the upper elastomeric member 114 may be substantially parallel with the inner tube 112 and may be even with an upper surface of the inner tube 112. When assembled, the upper elastomeric member 114 may abut with the upper washer 126.

The lower housing 118 supports the lower elastomeric member 116. The lower elastomeric member 116 may be pressed-fit within the lower housing 118. The lower housing 118 may have a cylindrical shape and include at least two flange portions 142 formed at opposite sides of the lower housing 118. The flange portions 142 may define a hole for receiving the fasteners 134.

The fasteners 134 may be used to attach the mount 110 to one of the vehicle components. For example, when assembled, the holes defined by the flange portions 132 of the upper ring 130 and the flange portions 142 of the lower housing 118 align with holes of a first vehicle component (similar to FIG. 1). The mount 110 may then be attached to the first vehicle component by way of the fasteners 134.

The lower elastomeric member 116 may further be supported by an outer ring 144. The outer ring 144 may be made of metal. The outer ring 144 may be a two piece ring including a first ring 144A and a second ring 144B. It would be appreciated by one skilled in the art that the outer ring 144 may be made of one or more pieces.

The upper chamber 120 and the lower chamber 122 may communicate by way of a fluid-track assembly 147. The fluid track assembly 147 is disposed within an inner ring 148. The inner ring 148 is fixedly coupled to an outer surface of the lower support 128. When assembled, the inner ring 148 moves with the lower support 128 and the inner tube 112.

The lower elastomeric member 116 is bonded to the lower support 128, the inner ring 148, and the outer ring 144. The lower elastomeric member 116 may substantially extend from the outer surface of the lower support 128 to the outer ring 144. The lower elastomeric member 116 may be molded around the outer ring 144. When the lower elastomeric member 116 is pressed-fit to the lower housing 118, the outer ring 144 may structurally support the lower elastomeric member 116 and the lower elastomeric member 116 may form a buffer between the outer ring 144 and the lower housing 118.

Furthermore, when assembled, the lower elastomeric member 116 may extend outside of an end portion 149 of the lower housing 118. For example, the lower elastomeric member 116 may protrude from the end portion 149, such that the lower elastomeric member 116 may abut with the lower washer 129 when the mount 110 is assembled.

The lower elastomeric member 116 defines the second portion of the upper chamber 120 and defines the lower chamber 122. The upper chamber 120 and the lower chamber 122 extend circumferentially around the inner tube 112 and lower support 128. The upper chamber 120 and the lower chamber 122 retain the fluid within the mount 110.

The mount 110 dampens vibrations by way of the fluid-track assembly 147. The fluid-track assembly 147 is housed in the inner ring 148 between the upper chamber 120 and the lower chamber 122. The fluid-track assembly 147 may include an annular member 150 and a fluid-track 152. The fluid-track 152 is defined along an outer surface of the annular member 150.

The fluid flows between the upper chamber 120 and the lower chamber 122 via the fluid-track 152. Specifically, the annular member 150 defines an upper opening 155 and a lower opening 157. The upper chamber 120 may access the fluid-track 152 via the upper opening 155. The lower chamber 122 may access the fluid-track 152 via the lower opening 157. In particular, an opening defined by a bottom portion of the inner ring 148 (not shown) aligns with the lower opening 157 to provide access to the lower chamber 122. A passage 159 is defined in a serpentine manner along the outer surface of the annular member 150 between the upper opening 155 and the lower opening 157. Accordingly, the fluid-track 152 fluidly couples the upper chamber 120 to the lower chamber 122.

The hydraulic mount 110 of the second embodiment couples the first vehicle component and a second vehicle component in a similar manner as the hydraulic mount 10 of the first embodiment. For instance, the mount 110 may be fixedly couple to the first vehicle component by the flange portions 132 of the upper ring 130 and the flange portions 142 of the lower housing 118.

The second vehicle component may then be attached to the mount 110 by way of the bolt. Specifically, the bolt extends through the second vehicle component and the upper washer 126, the inner tube assembly 111 and the lower washer 129 of the mount 110. The bolt may further be coupled to a nut to secure the bolt in place.

Accordingly, the mount 110 couples the first vehicle component to the second vehicle component by way of the upper washer 126, the inner tube assembly 111, the lower washer 129, and the lower housing 118. Furthermore, the upper elastomeric member 114 and the lower elastomeric member 116 springingly couple (elastomerically couple) the first vehicle component and the second vehicle component by way of the upper washer 126, the inner tube assembly 111, the lower washer 129 and the lower housing 118.

In operation, the hydraulic mount 110 dampens vibrations by way of the fluid-track assembly 147. As the vehicle components move, the mount 110 deflects, thereby compressing and/or extending the upper elastomeric member 114. The upper elastomeric member 114 may absorb some of the load transmitted between by the vehicle components.

The mount 110 of the second embodiment can be adapted to dampen vibrations at a predetermined frequency. In particular, as the mount 110 compresses and/or extends, one of the upper chamber 120 or the lower chamber 122 is raised to a higher pressure than other chamber 120 or 122. As a result, fluid is pushed from the higher pressure chamber to the lower pressure chamber via the fluid-track 152.

The mount 110 of the second embodiment includes the one piece mount configuration similar to the first embodiment. However, the mount 110 of the second embodiment does not include a decoupler (the decoupler cap and the decoupler ring) which prevents dampening at small amplitudes. Thus, the mount 110 of the second embodiment dampens vibrations at a predetermined frequency for varying amplitudes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A hydraulic mount for coupling a first component and a second component in a vehicle, the mount comprising:
    a first elastomeric member defining a first portion of a first chamber;
    a second elastomeric member defining a second portion of the first chamber and a second chamber, the first chamber and the second chamber each able to retain fluid in a liquid seal manner;
    an inner tube assembly defining an opening for receiving a bolt, wherein the first elastomeric member and the second elastomeric member are fixedly secured to an outer surface of the inner tube assembly;
    an inner ring fixedly coupled to the inner tube assembly at a position between the first chamber and the second chamber, wherein the second elastomeric member is fixedly secured to an outer surface of the inner ring; and
    a decoupler fixedly disposed within the inner ring, the decoupler adapted to move between rigid surfaces adjacent the first and second chambers, wherein the decoupler includes:
    a decoupler housing including an annular channel, a bottom surface, and a lower opening in the bottom surface, the lower opening enabling fluid to flow into and out from the annular chamber relative to the second chamber;
    a decoupler ring movable axially within the annular channel;
    a decoupler cap configured to rest at least partially within the decoupler housing and including at least one opening for enabling fluid flow therethrough into and out from the annular chamber relative to the second chamber; and wherein a surface of the decoupler housing and a surface of the decoupler cap define axially spaced apart surfaces that act as limits of axial travel for the decoupler ring.

2. The mount of claim 1, wherein:
the decoupler includes a fluid track; and
wherein the fluid flows between the first chamber and the second chamber by way of the fluid-track.

3. The mount of claim 2, wherein the fluid track of the decoupler forms a serpentine flow path.

4. The mount of claim 1, wherein the fluid flows between the first chamber and the second chamber by way of the fluid-track when the decoupler ring abuts with either the bottom surface of the decoupler housing or the decoupler cap.

5. The mount of claim 1, wherein the decoupler is operable to isolate vibrations having an amplitude less than a predetermined amplitude, and to dampen vibrations having an amplitude greater than the predetermined amplitude, at a predetermined frequency.

6. The mount of claim 1, wherein the decoupler is operable to isolate vibrations having an amplitude less than or equal to a predetermined amplitude for all frequencies.

7. The mount of claim 1, wherein the decoupler is adapted to dampen vibrations having an amplitude greater than a predetermined amplitude at a predetermined frequency.

8. The mount of claim 1, wherein the second chamber is axially spaced apart from the first chamber.

9. The mount of claim 1, wherein the decoupler is housed within an annular opening in the second elastomeric member and arranged concentrically with the inner tube assembly.

10. The mount of claim 1, wherein the inner tube assembly includes:
an inner tube arranged concentrically within the first and second elastomeric members.

11. The mount of claim 10, wherein the inner tube assembly further comprises:
a lower support member fixedly coupled to the inner tube;
wherein the first elastomeric member is bonded to an outer surface of the inner tube;
wherein the second elastomeric member is fixedly secured to an outer surface of the lower support member, and
wherein the inner ring is fixedly coupled to the lower support member.

12. A hydraulic mount for coupling a first component and a second component in a vehicle, the mount comprising:
a first elastomeric member defining a first portion of a first chamber;
a second elastomeric member defining a second portion of the first chamber and a second chamber, the first chamber and the second chamber each able to retain fluid in a liquid seal manner;
an inner tube assembly defining an opening for receiving a bolt, wherein the first elastomeric member and the second elastomeric member are fixedly secured to an outer surface of the inner tube assembly;
an inner ring fixedly coupled to the inner tube assembly at a position between the first chamber and the second chamber;
the inner ring including an annular channel and arranged concentrically with the inner tube assembly, the second elastomeric member being fixedly secured to an outer surface of the inner ring;
a decoupler assembly fixedly disposed within the inner ring, the decoupler assembly including a non-linear flow path formed on a surface thereof to channel flow along a non-linear path; and
the decoupler assembly further including an element disposed for axial movement to further help control fluid flow between the first and second chambers, in response to vibrations.

13. The mount of claim 12, wherein the decoupler assembly includes:
a decoupler housing having an annular channel formed therein, and wherein the non-linear flow path formed on the surface includes a non-linear flow path formed on an exterior surface of the decoupler housing.

14. The mount of claim 12, wherein the element forms a decoupler ring disposed in the annular channel of the decoupler housing, the decoupler ring being able to move axially within the decoupler housing in response to vibration experienced by the mount.

15. The mount of claim 14, wherein the decoupler assembly further includes a decoupler cap positioned in the annular channel of the decoupler housing for helping to control axial movement of the decoupler ring and further helping to control fluid flow into and out from the first chamber relative to the decoupler housing.

* * * * *